United States Patent [19]

Farmer

[11] 4,035,790

[45] July 12, 1977

[54] MONITORING DEVICE FOR FIBER CUTTER

[75] Inventor: Harold Farmer, Griffith, Ind.

[73] Assignee: United States Gypsum Company, Chicago, Ill.

[21] Appl. No.: 655,308

[22] Filed: Feb. 4, 1976

[51] Int. Cl.² .................................... G08B 21/00
[52] U.S. Cl. ........................ 340/267 R; 241/36; 340/259
[58] Field of Search ........... 340/259, 267 R; 83/72, 83/73; 241/33, 36; 222/23, 80

[56] References Cited

U.S. PATENT DOCUMENTS

| 2,340,673 | 2/1944 | Lotz et al. | 340/267 R |
| 2,659,881 | 11/1953 | Bogot et al. | 340/267 R |
| 2,867,385 | 1/1959 | Martin | 241/36 |
| 3,739,367 | 6/1973 | Fathauer | 340/267 R |

Primary Examiner—John W. Caldwell
Assistant Examiner—Joseph E. Nowicki
Attorney, Agent, or Firm—Samuel Kurlandsky; Robert H. Robinson; Donnie Rudd

[57] ABSTRACT

An apparatus for monitoring the output of a fiber cutter arranged to cut long fiber roving strands into short clippings and to feed the clippings into a slurry-containing mixer, the monitoring apparatus having a plurality of rotatably mounted assemblies each comprising a rotating shaft and a plurality of arms mounted thereon. During normal operation the fiber clippings fall through the moving arms and into an apparatus wherein the fibers are mixed into a slurry, such as a calcined gypsum slurry. Malfunction of the cutting apparatus resulting in the discharge of long fiber strands causes entanglement of the fiber strands with the moving arms, thereby causing rotation of the assemblies to discontinue and actuating an alarm and automatic switches, thereby rendering the entire apparatus inoperative and preventing serious entanglement of the mixing and conveying apparatus which could result in long shut-down periods.

20 Claims, 5 Drawing Figures

MONITORING DEVICE FOR FIBER CUTTER

BACKGROUND OF THE INVENTION

1. Field of Invention

The present invention relates to the manufacture of solid materials such as gypsum wallboard having cut fibers disposed therein, and more particularly refers to a novel device for monitoring a cutting apparatus which cuts long fiber roving strands into short clippings, the monitoring device being arranged to actuate an alarm and to turn off the cutting apparatus when it malfunctions.

2. Description of the Prior Art

Gypsum wallboard is conventionally made with short cut fibers dispersed therein when it is desired to enhance the mechanical properties of the board.

In practice, long roving strands of glass fiber are introduced into a conventional cutter which cuts the strands into short strands or clippings. The short strands are then introduced into a mixing chamber and mixed with a gypsum slurry and the slurry conveyed out of the chamber and spread onto a belt in a thin sheet having paper cover sheets on both bottom and top surfaces. After extended operation the blades of the cutter become dull and fail to cut the long rovings. The long uncut rovings are as a result introduced into the mixing chamber and screw conveyer where they cause extensive tangling of the conveyor blades and eventually cause the apparatus to malfunction and to stop. Generally several hours of shut-down time are required in order to clean out the entangled apparatus. Such a shut-down is very expensive and requires skilled labor to restore the apparatus to normal operation again.

SUMMARY OF THE INVENTION

It is accordingly an object of the invention to provide an apparatus for detecting malfunction of a cutting apparatus used to cut glass rovings into short fibers.

It is a further object to provide an apparatus of the type described which is reliable and which is arranged to sound an alarm when malfunction of the cutting apparatus is detected.

It is still further an object to provide an apparatus which may be used to stop the entire cutting, mixing or extrusion apparatus when a malfunction of the cutting apparatus is detected.

It is still further an object to provide an apparatus for detecting malfunction of a cutter apparatus which is relatively inexpensive and highly reliable over extended periods of operation.

Other objects and advantages of the invention will become apparent upon reference to the drawings and details description.

According to the invention, a monitoring device is placed below a fiber cutting apparatus. The monitoring device comprises a housing having a pair of substantially parallel spaced-apart shafts rotatably mounted therein each having a plurality of radial arms having axial arms mounted at the ends thereof. The shafts are caused to rotate while fiber clippings pass therethrough. Upon malfunction of the cutter blades, long uncut strands pass into the monitoring device and cause entanglement of the rotating arms, and thereby terminating rotation of the shafts. The termination of rotation is detected by a zero motion detector which causes an alarm to be sounded and the associated apparatus such as the cutter to be stopped.

DESCRIPTION OF THE PREFERRED EMBODIMENT

Figure 1:
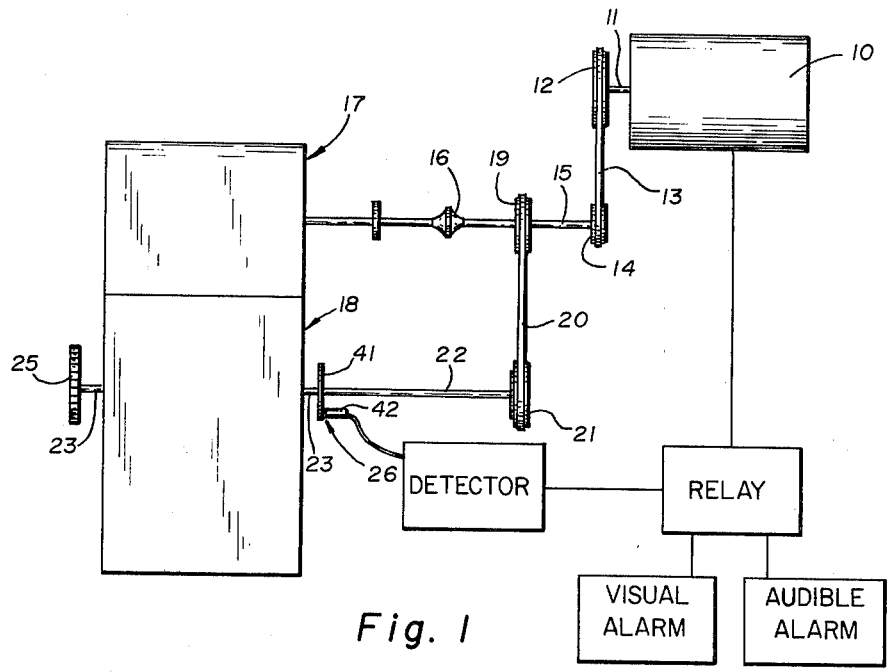
FIG. 1 is a front elevational view in diagram of an apparatus utilizing the monitoring device of the invention.
Figure 2:
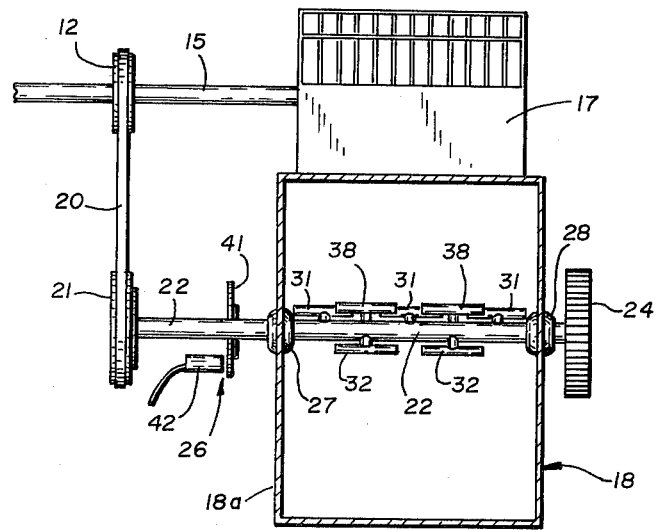
FIG. 2 is a front elevational view showing the cutter box and monitoring device.

Referring to FIG. 1, an apparatus according to the invention is shown comprising a motor 10 having a shaft 11 mounting a pulley or sheave 12. The pulley 12 is operatively connected by means of an endless belt 13 to another pulley 14 mounted on a shaft 15 connected by means of a coupling 16 to a glass fiber cutter box 17. The glass fiber cutter box 17 is conventional and has a rotatably mounted drum having blades thereon and a back-up drum (not shown). A monitoring device 18 according to the invention is mounted below the cutter box 17. A pulley 19 mounted on the shaft 15 is operatively connected by means of an endless belt 20 to a pulley 21 mounted on a shaft 22 rotatably mounted in the monitoring device 18. A second shaft 23 is rotatably mounted in the monitoring device substantially parallel and spaced-apart with respect to the shaft 22. A gear 24 is mounted on the end of the shaft 22 and is operatively engaged with a gear 25 mounted at the end of the shaft 23, thereby causing the shaft 23 to be rotated in opposite direction to the shaft 22. A zero speed indicator 26 is mounted at the other end of the shaft 23.

Figure 4:
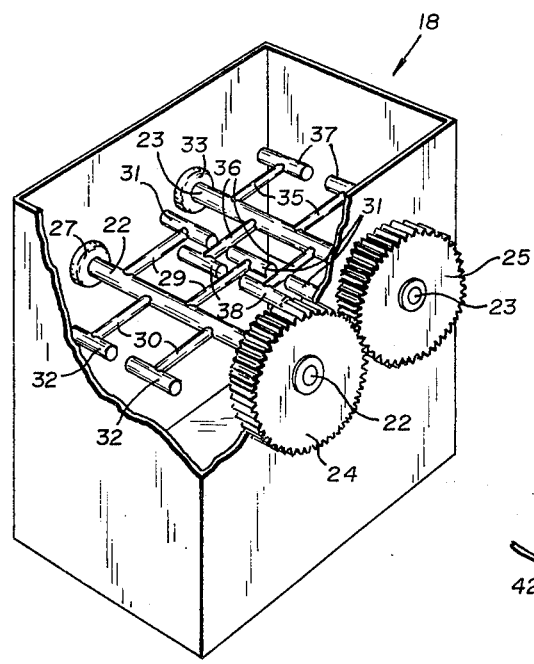
FIG. 4 is a perspective view, partly broken away, of the monitoring device of the invention.
Figure 5:
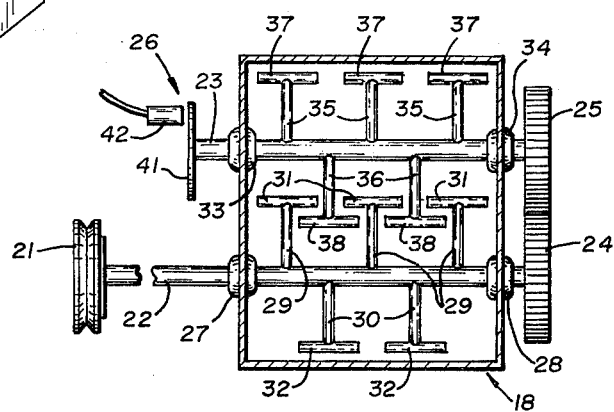
FIG. 5 is top view of the monitoring device shown in FIG. 4.
Figure 3:
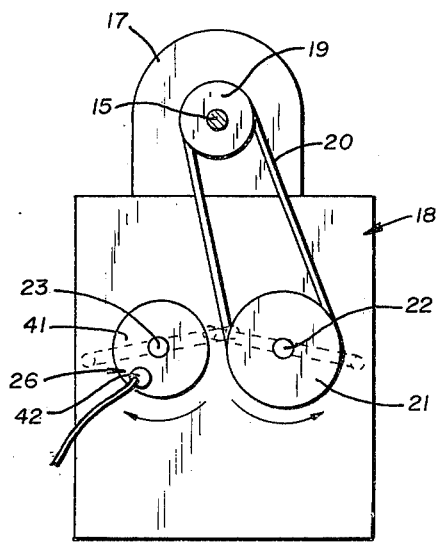
FIG. 3 is a side view of the apparatus shown in FIG. 2.

Referring to FIGS. 4 and 5, the monitoring device 18 of the invention is shown in greater detail and comprises a tubular housing 18a of rectangular cross-section having an open top and open bottom. As shown, the shaft 22 is mounted in bearings 27 and 28 and is provided with radial arms 29 and 30. The radial arms 29 have axial arms 31 mounted at the ends thereof, and the radial arms 30 have axial arms 32 mounted at the ends thereof. The shaft 23 is mounted in bearings 33 and 34 and is provided with radial arms 35 and 36 having axial arms 37 and 38 mounted at the ends thereof, respectively.

The zero-speed indicator 26 is operatively mounted in relation to the monitoring device and comprises a disc 41 of a ferromagnetic material mounted at the end of the shaft 23, and a magnetic detector 42 which is operatively connected to an electrical control device (not shown).

In operation, the electrical motor 10 is turned on, causing the glass cutter to rotate and also the shafts 22 and 23 of the monitoring device to rotate. The radial and axial arms of the monitoring device are arranged so that the axial arms of one shaft pass inside the axial arms of the other shaft, and are preferably so coupled that they pass close to each other. Glass fiber roving strands are introduced into the glass cutter and are cut into short lengths which fall through the revolving arms of the rotating shafts and pass out of the monitoring device into a chamber where the glass fibers are mixed with a gypsum slurry and subsequently conveyed onto a forming belt. After an extended period of operation the blades of the cutter become dull and eventually permit long glass rovings to pass therethrough without being cut into small pieces. As the long glass rovings pass between the revolving arms of the monitoring device, they become entangled in the arms, causing the rotating shafts 22 and 23 to stop. Such stoppage is permitted by the friction clutch of the pulley 21. As a result, the disc 41 stops rotating. This is detected by the magnetic detector 42 which is connected to conventional apparatus which causes an alarm to be sounded and the machinery to be shut off. The monitoring device can be readily cleared of glass fiber, the blades changed on the cutter, and the entire apparatus quickly restarted. Because of the prompt sounding of the alarm and turning off of the mixing and conveying machinery, fouling of the subsequent machinery is prevented and the resultant long period of shut-down time avoided.

The monitoring device of the present invention is so designed that it can utilize standard available parts. The cutter is a standard Finn and Fram model 80 glass cutter available on the market. The zero-speed indicator is a ROTECTOR unit manufactured and marketed by Electro-Sensors Inc., Minneapolis, Minnesota. Other forms of zero-speed indicators may be utilized and are still to be considered as falling within the spirit and scope of the invention.

Although the device of the invention is specifically designed to monitor the cutting of the glass fibers, other fibers such as synthetic plastic fibers or natural fibers may be cut and monitored by the invention.

The apparatus of the present invention offers a number of advantages. It is highly reliable and operates over extended periods of time without the need for attention or servicing. It readily detects malfunction of the cutting blades and immediately sounds an alarm, and if desired, acts to stop the cutting and even the mixing and conveying machinery utilized in the process, as for example in making gypsum wallboard. The device is simple to construct and relatively inexpensive.

It is to be understood that the invention is not to be limited to the exact details of operation or materials shown and described as obvious modifications and equivalents will be apparent to one skilled in the art.

Invention is claimed as follows:

1. A monitoring device adapted for use in combination with a cutting apparatus designed for cutting long fiber roving strands into short cut fibers, said monitoring device comprising a frame, a plurality of rotatably mounted assemblies, each of said assemblies comprising a shaft rotatably mounted in said frame, and long fiber strand-engaging means mounted on said shaft, said frame having inlet and outlet for said cut fibers, means for rotating said rotatably mounted assemblies, said rotatably mounted assemblies being arranged when rotated to permit cut fibers to pass therethrough but to engage and become entangled with long fiber roving strands which pass into said monitoring device as a result of a malfunction of said cutting apparatus, thereby causing said rotatably mounted assemblies to stop rotating, and means for the detecting discontinuation of rotation of said rotatably mounted assemblies.

2. A monitoring device according to claim 1, wherein each shaft has a plurality of radial arms and each having an axial arm, mounted at the end thereof and wherein said radial arms are sufficiently long so that the axial arms of one shaft pass behind the axial arms of the other.

3. A monitoring device according to claim 2, wherein said shafts are so synchronized that when the arms of one shaft pass the arms of the other they are substantially in coplanar relationship.

4. A monitoring device according to claim 1, wherein said shafts rotate in opposite directions.

5. A monitoring device according to claim 1, wherein said detecting means comprises a disc of a ferromagnetic material affixed to one of said shafts and a magnetic pickup mounted in proximity to said disc for detecting discontinuation of rotation of said disc.

6. A monitoring device according to claim 1, wherein said detecting means is adapted to actuate an audible alarm when said shafts discontinue rotating.

7. A monitoring device according to claim 1, wherein said detecting means is adapted to actuate a visual alarm when said shafts discontinue rotating.

8. A monitoring device according to claim 1, wherein said detecting means is adapted automatically to turn off said cutting device.

9. A monitoring device according to claim 1, wherein said detecting means is adapted to sound an audible alarm and to automatically turn off said cutting apparatus.

10. A monitoring device according to claim 1, wherein said monitoring device is adapted to monitor glass fiber.

11. In combination, a cutting device for cutting long fiber roving strands into short fibers, and a monitoring device adapted to detect malfunction of said cutting device, said cutting device comprising a plurality of blades mounted on a rotatable support and means for rotating said support, said monitoring device comprising a frame, a plurality of rotatably mounted assemblies comprising a shaft rotatably mounted in said frame, and long fiber strand-engaging means mounted on said shaft, said frame having inlet and outlet for said cut fibers, means for rotating said rotatably mounted assemblies, said rotatably mounted assemblies being arranged when rotated to permit cut fibers to pass therethrough but to engage and become entangled with long fiber roving strands which pass into said monitoring device as a result of a malfunction of said cutting apparatus, thereby causing said rotatably mounted assemblies to discontinue rotating, and means for the detecting discontinuation of rotation of said rotatably mounted assemblies.

12. A conbination according to claim 11, wherein each shaft has a plurality of radial arms each having an axial arm mounted at the end thereof and wherein said radial arms are sufficiently long so that the axial arms of one shaft pass behind the axial arms of the other.

13. A combination according to claim 12, wherein said shafts are so synchronized that when the arms of one shaft pass the arms of the other they are substantially in coplanar relationship.

14. A combination according to claim 11, wherein said shafts rotate in opposite directions.

15. A combination according to claim 11, wherein said detecting means comprises a disc of a ferromagnetic material affixed to one of said shafts and a magnetic pick-up mounted in proximity to said disc for detecting discontinuation of rotation of said disc.

16. A combination according to claim 11, wherein said detecting means is adapted to actuate an audible alarm when said shafts discontinue rotating.

17. A conbination according to claim 11, wherein said detecting means is adapted to actuate a visual alarm when said shafts discontinue rotating.

18. A combination according to claim 11, wherein said detecting means is adapted automatically to turn off said cutting device.

19. A combination according to claim 11, wherein said detecting means is adapted to sound an audible alarm and to automatically turn off said cutting apparatus.

20. A combination according to claim 11, wherein said monitoring device is adapted to monitor glass fiber.

* * * * *